(12) United States Patent
Wu

(10) Patent No.: US 7,243,433 B2
(45) Date of Patent: *Jul. 17, 2007

(54) LASER LEVEL WITH ADJUSTABLE LASER PROJECTION LINE

(75) Inventor: Shuming Wu, Nanjing (CN)

(73) Assignee: Chervon International Trading Co., Ltd. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 11/383,041

(22) Filed: May 12, 2006

(65) Prior Publication Data

US 2006/0191147 A1    Aug. 31, 2006

Related U.S. Application Data

(63) Continuation of application No. 10/706,227, filed on Nov. 12, 2003, now Pat. No. 7,055,252.

(30) Foreign Application Priority Data

Dec. 27, 2002    (CN) .................................. 02 2 93048

(51) Int. Cl.
*G01B 11/26* (2006.01)

(52) U.S. Cl. ....................................................... 33/286

(58) Field of Classification Search .................... 33/227
See application file for complete search history.

(56) References Cited

U.S. PATENT DOCUMENTS

| | | | | | |
|---|---|---|---|---|---|
| 5,368,889 | A | * | 11/1994 | Johnson et al. | 427/244 |
| 5,519,942 | A | * | 5/1996 | Webb | 33/290 |
| 5,531,031 | A | * | 7/1996 | Green | 33/365 |
| 5,842,282 | A | * | 12/1998 | Ting | 33/227 |
| 6,012,229 | A | * | 1/2000 | Shiao | 33/365 |
| 6,502,319 | B1 | * | 1/2003 | Goodrich et al. | 33/286 |
| 6,735,879 | B2 | * | 5/2004 | Malard et al. | 33/286 |
| 7,013,570 | B2 | * | 3/2006 | Levine et al. | 33/286 |
| 7,055,252 | B2 | * | 6/2006 | Wu | 33/286 |
| 2005/0022399 | A1 | * | 2/2005 | Wheeler et al. | 33/286 |

\* cited by examiner

*Primary Examiner*—Christopher W. Fulton
(74) *Attorney, Agent, or Firm*—McDermott Will & Emery LLP

(57) ABSTRACT

A laser level with adjustable laser projection line comprises a support bracket, a housing, a switch, a laser generator which project a fanned laser beam to the surface of the work piece to form a line, and wherein a rotating mechanism is coupled to rotate the laser generator thereby causing rotation of the line. There is also a positioning device to position the laser level on an arbitrary surface.

22 Claims, 4 Drawing Sheets

LASER LEVEL WITH ADJUSTABLE LASER PROJECTION LINE

RELATED APPLICATIONS

This application is a continuation of U.S. Pat. No. 7,055,252, filed on Nov. 12, 2003, which claimed priority from Chinese Application 02203049.5, filed on Dec. 27, 2002. Priority to these application is claimed under 35 U.S.C. §§119 and 120, and the disclosure of these applications is incorporated herein by reference in its entirety.

FIELD OF THE INVENTION

The present invention relates to an alignment-product which reflects a line on a surface as a positioning reference, and particularly to a laser level which marks a line on a reference surface with the fanned beam projected by a laser generator.

BACKGROUND OF THE INVENTION

There are many kinds of laser alignment devices, which project laser beams by laser generators to mark lines. One such device is designed by U.S. Tool Co. (U.S. Patent Application Publication No. US2002/0178596A1), which can project a line of fixed orientation. Another such device is marketed by U.S. CTB/Berger, which can project a horizontal line and a plumb line decussate to each other on walls perpendicular to the direction of propagation of the laser. The former can merely project a line parallel to the baseplane of its pedestal; the latter can form two lines vertical with each other, but there is a disadvantage that two laser generators are needed, and as the switch is turned on, required or not, the two laser generators project beams simultaneously, thereby causing much more power consumption.

SUMMARY OF THE INVENTION

It is an object of the present invention to provide a laser level with only one laser generator which can be rotated 90 degrees to alter the location relationship of the laser beam with the base plane of the laser level.

Another object of the present invention is to provide a means to mount the laser level on a metallic surface.

A further object is to provide a separate base plate which can protrude a plurality of retractable pins to suspend and hold the laser level on a surface of plastic, cork, wood, drywall or other soft object.

An even further object of this invention is to provide one or more level bubbles to indicate whether the laser beam is horizontally or vertically level.

To achieve the objects hereinbefore, the laser alignment device of the present invention includes a support bracket, a clamshell housing defined by a left clamshell housing member and a right clamshell housing member, a laser generator, a battery to power the laser generator, a cover for a battery pack, a switch, a protective door and a rotating mechanism. The protective door is used to activate the trigger of the linked switch. The laser generator will be switched off when the door is closed, and the lens of the laser generator will be protected against dust. When the door is opened, the switch connects the laser generator to the power supply and the laser generator will project a fan-shaped laser beam to form a line on a surface.

The rotating mechanism includes a knob which can rotate from 0 to 90 degrees, and which is coupled to the laser generator to rotate the laser generator when the knob is turned, thereby causing rotation of the line on the plane.

There may be a magnetic attachment means on the base of the support bracket. When it is necessary to secure the laser level on a surface of a metallic object (e.g., a pipe or metal stud) one needs only to place the laser level with adjustable laser projection line onto the metallic object, and the laser level will be held there via the magnetic attachment means. In this manner, the laser level can be positioned on a non-horizontal plane in a relatively secure position, and avoid instability.

The laser level with adjustable laser projection line also includes a separate removable mounting baseplate having two or more retractable pins which can be extended from the removable mounting baseplate and inserted into the wall, wood, plastic or other soft object as desired. When not in use, the pins can retract into a cavity in the removable mounting baseplate.

The laser level with adjustable laser projection line can be powered by an internal battery. The user need only screw the cover off without the aid of a tool to remove the discharged battery cells and fill in new battery cells to power the laser generator.

The laser level can further comprise two conventional level bubbles which are perpendicular to each other on the top of the laser level. The two level bubbles are both parallel to the bottom of the laser level, for orientation or leveling a precise horizontal line or plumb line.

The laser level with adjustable laser projection line disclosed by the present invention can expediently mark a reference line accordingly on a workpiece as needed. The reference line can be parallel, vertical or be adjusted to other angular degrees to the bottom of the laser level.

DETAILED DESCRIPTION OF THE DRAWINGS

Figure 1:
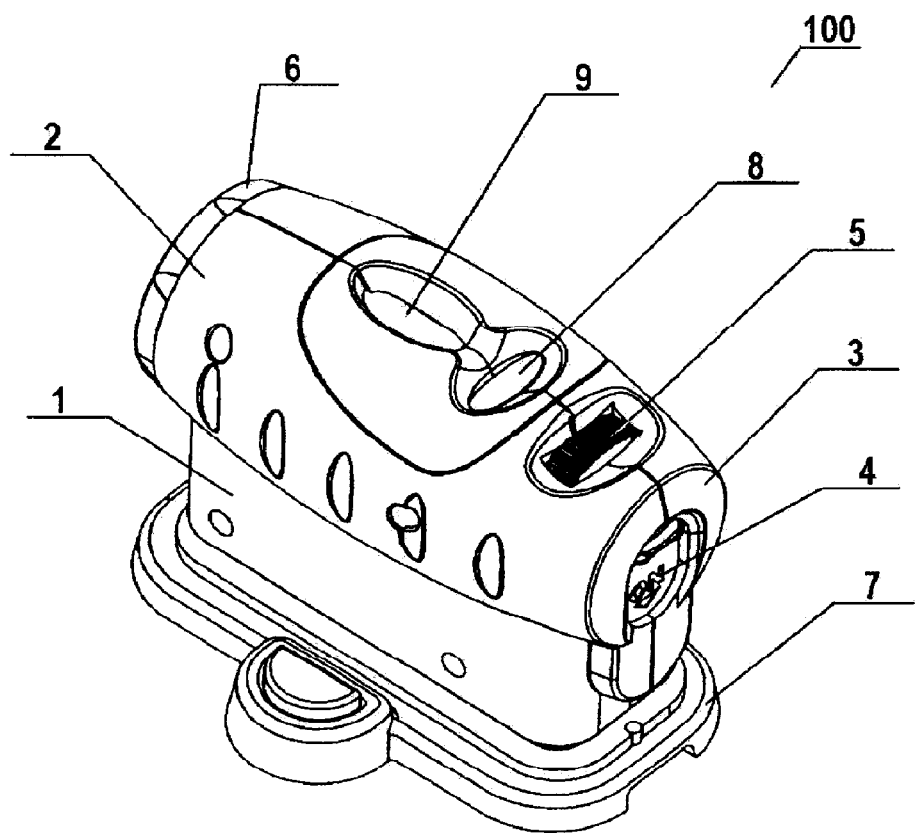
FIG. 1 illustrates a perspective view of a preferred embodiment of a laser level with adjustable laser projection line according to the present invention.
Figure 2:
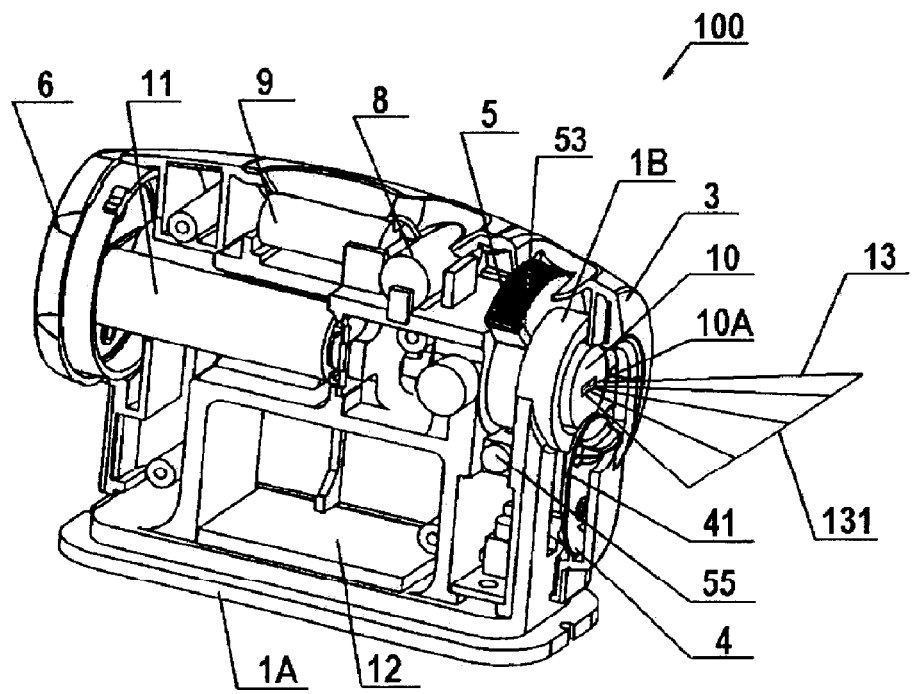
FIG. 2 is an inner perspective view of the laser level of FIG. 1 with left clamshell housing member removed.

Referring to FIGS. 1 and 2, the laser level with adjustable laser projection line 100 of the present invention comprises a support bracket 1, a left clamshell housing member 2, a right clamshell housing member 3, a laser protection door 4, a laser generator 10 mounted on the front bracket 1B of the support bracket 1, a battery pack 11 or power supply to power the laser generator 10, a switch 41 to control the laser generator 10 and a cover 6 for the battery pack. The protective door 4 can trigger the switch 41 when it is opened or closed, as shown in FIG. 1. As the door 4 is in the closed position, it slides the switch 41 to the off position and switches off the laser generator 10. The closed door 4 also protects the laser generator 10 and lens 10A against dust. When the door 4 is pushed downwardly to access lens 10A of the laser generator 10, as shown in FIG. 2, the door 4 slides the switch 41 to the on position at the same time, switching on the laser generator 10 to project a fan-shaped laser beam 13 and form a line 131 on the surface to be illuminated.

Figure 3:
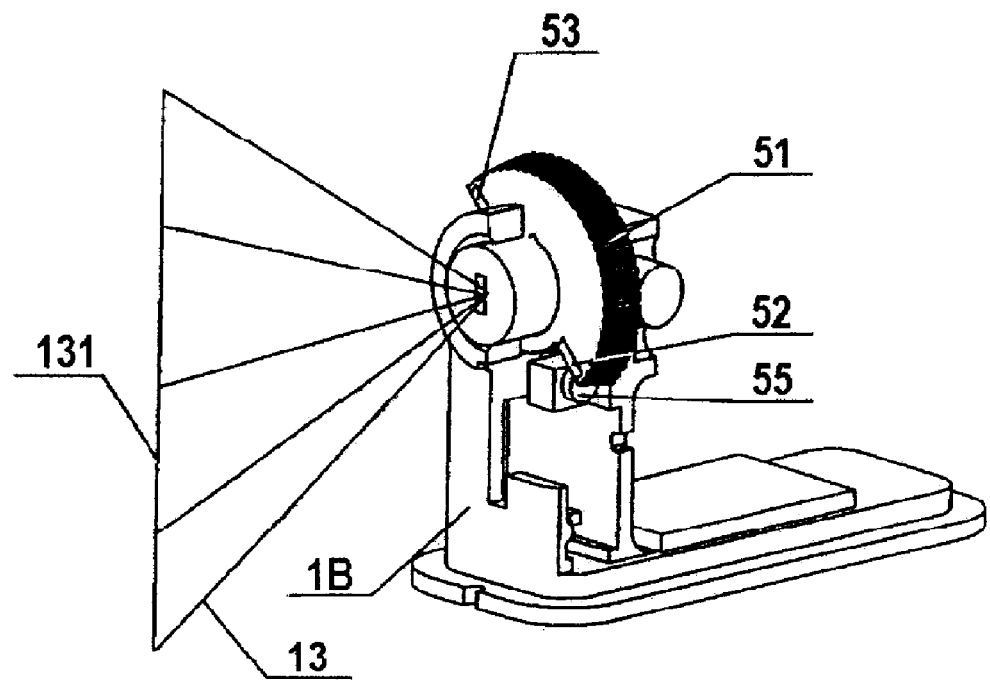
FIG. 3 is a sectional view of the mechanism for rotating the laser when the mechanism is rotated to its right limit with the laser beam perpendicular to the bottom plate of the laser level.
Figure 4:
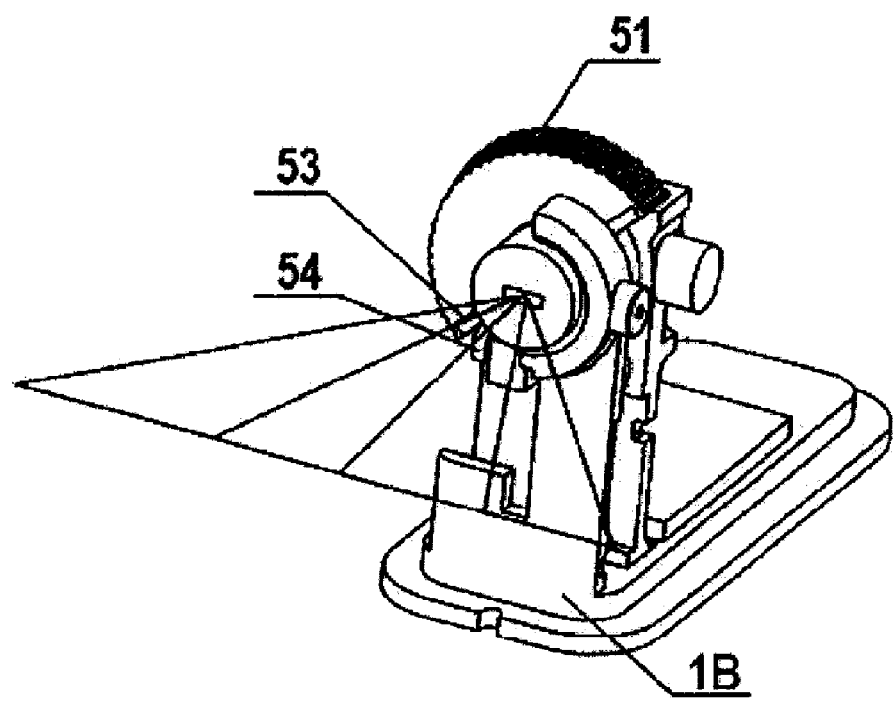
FIG. 4 is a sectional view of the rotating mechanism when it is rotated to its left limit with the laser beam parallel to the bottom plate of the laser level.

Referring now to FIGS. 3 and 4, the laser generator 10 in the laser alignment device 100 of the present invention includes a rotating mechanism 5, which can have a knob 51 secured on the laser generator 10 which will rotate along with the rotation of knob 51. When knob 51 is turned clockwise to its limit, the planar beam projected by the laser generator 10 will be parallel to the bottom of laser level 100 (FIG. 4); and, when knob 51 is turned counterclockwise to its limit (the angular degree of rotation preferably being 90 degrees), the planer beam projected by the laser generator 10 will be perpendicular to the bottom of the laser alignment device 100 (FIG. 3). To avoid knob 51 from rotating arbitrarily and affecting the stability of the laser beam position accordingly, it is preferred to arrange two magnetic members 52, 53 on knob 51, and arrange two fastening members 54, 55 on the corresponding position of the front bracket 1B. When the knob 51 being rotated to its clockwise limit, the fastening member 54 is caught by the magnetic member 53; and when knob 51 rotates to its counterclockwise limit, the fastening member 55 is caught by the magnetic member 52, ensuring the position of knob 51 and thereby maintaining the stability of the laser beam position.

Referring to FIGS. 1 and 2, the laser alignment device 100 of the present invention may advantageously comprise one or more leveling devices such as bubbles 8, 9 to orientate or level the laser level 100 on a horizontal or vertical plane. The leveling bubbles 8, 9 are parallel to the bottom of the laser level 100. Bubble 8 is used to level the horizontal relationship of the elongated side position of the laser level with adjustable laser projection line 100, and bubble 9 is used to level the horizontal relationship of fore-and-aft position of the laser level 100. Thus, laser level 100 can provide accurate horizontal lines and plumb lines with the usage of the level bubbles 8, 9.

The laser level with adjustable laser protection line 10 as described above can also be used on a horizontal position for a metallic surface. To solve this problem, as shown in FIG. 2, a magnet 12 is mounted on the base 1A of the support bracket 1 of the laser level 100, thereby allowing laser alignment device 100 to be placed and held on an arbitrary portion of the metallic surface.

Figure 5:
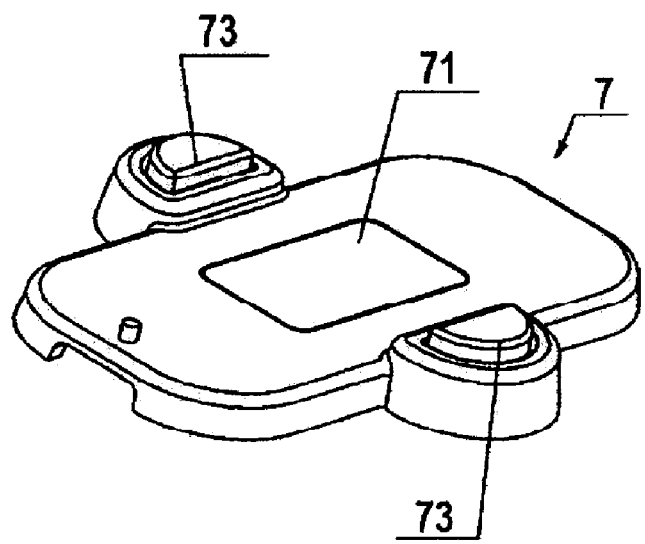
FIG. 5 is a sectional view of the removable base plate.
Figure 6:
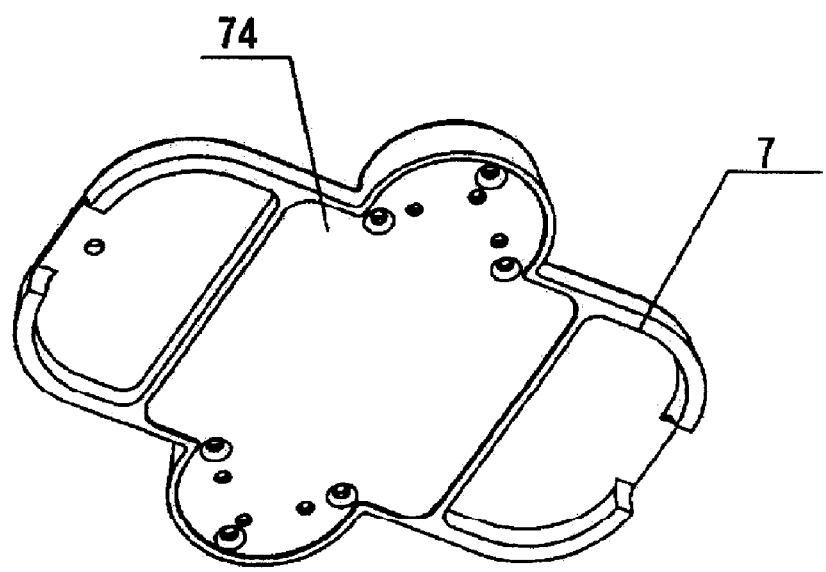
FIG. 6 is a sectional view of the removable base plate wherein the positioning pins are retracted inside the removable base plate.
Figure 7:
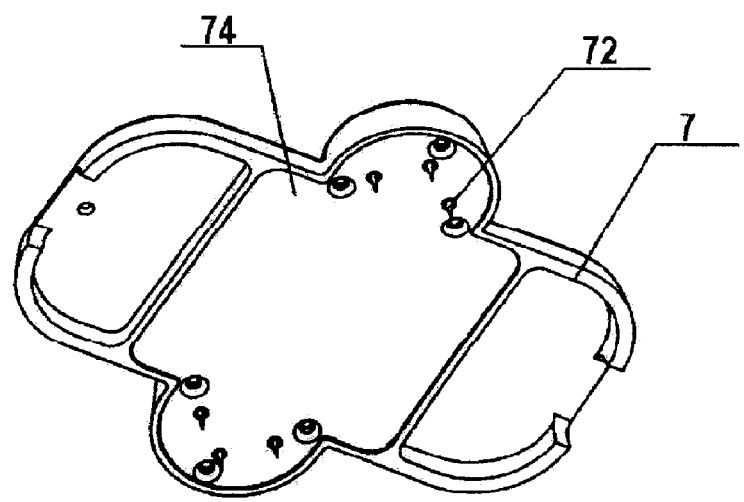
FIG. 7 is a sectional view of the removable base plate wherein the positioning pins protrude outward.

To position laser level 100 on a wood, plastic, drywall or other surface, as shown in FIG. 1, a removable baseplate 7 may be used with the laser level 100 for mounting. As shown in FIG. 5, the baseplate 7 comprises two pushpads 73 each including at least one retractable positioning pin 72. In the embodiment shown in FIGS. 5–7, there are three retractable pins 72 on each pushpad 73. When pushpads 73 are relaxed, the retractable pins 72 are retracted within the removable mounting baseplate 7, as shown in FIG. 6, thus preventing the operator from being stabbed carelessly. When pushpads 73 are pressed down, the positioning pins 72 will extend outwardly from the bottom 74 of the mounting baseplate 7 as shown in FIG. 7. The mounting baseplate 7 can be mounted to the surface of a wall (drywall, plastic, plaster or other surface) by inserting the retractable pins 72 into the surface. The laser level 100 can then be attached to the mounting baseplate 7 by placing the magnet 12 on the bottom of the laser level 100 to a metallic attachment surface 71 on the mounting baseplate 7 thereby fastening the laser level 100 to the baseplate 7.

Figure 8:
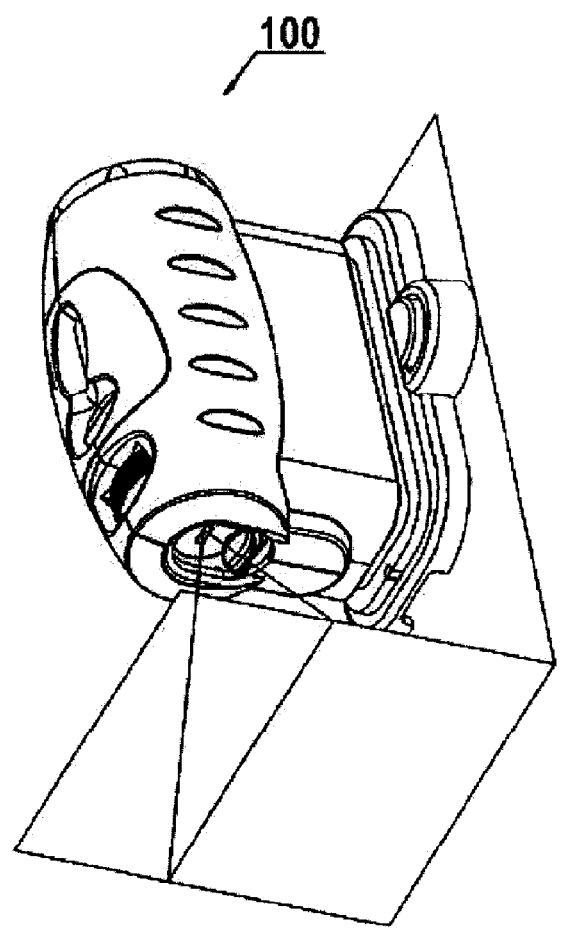
FIG. 8 is a perspective view of the laser level with adjustable laser projection line when it is positioned and held on a vertical plane.

FIG. 8 is a perspective view of the laser alignment device 100 when it is situated on the vertical plane with the laser beam projecting downwardly.

What I claim is:

1. A method for projecting a light beam generated from a light generating device, the method comprising:
   attaching the light generating device to a first surface;
   projecting a laser beam through a lens to form a line having a first position on a second surface to be illuminated; and
   rotating the lens clockwise until a stop brings it to its limit such that the line on the second surface is one of either perpendicular or horizontal to the light generating device.

2. The method of claim 1, wherein the step of attaching the light generating device to a first surface comprises inserting a pin into the first surface.

3. The method of claim 1, wherein the step of attaching the light generating device to a first surface comprises placing a magnet in close proximity to a metal surface.

4. The method of claim 1, wherein the step of attaching the light generating device to a first surface comprises:
   attaching a base having a first side and a second side to the first surface such that the first side is adjacent the first surface; and
   attaching the light generating device to the second side of the base.

5. The method of claim 1 further comprising the step of rotating the lens counter-clockwise until a stop brings it to its limit such that the line on the second surface is the other one of either perpendicular or horizontal to the light generating device.

6. The method of claim 1 further comprising the step of leveling the light generating device on one of a horizontal or vertical plane.

7. A method for projecting a light beam generated from a light generating device, the method comprising:
   attaching a mounting base to a first surface;
   connecting the light generating device to the mounting base;
   generating light from the line generating device to form a line having a first position on a second surface perpendicular to the first surface; and
   adjusting the light generated from the line generating device until a stop defines a second position of the line on the second surface, which forms an angle between about 0 and 90 degrees from the first position of the line on the second surface.

8. The method of claim 7, wherein the mounting base comprises a retractable pin and an actuator.

9. The method of claim 7, wherein the mounting base comprises a plurality of retractable pins.

10. The method of claim 7, wherein the mounting base has a metallic attachment surface.

11. The method of claim 10, wherein the light generating device has a magnet and the step of attaching the light generating device to the mounting base comprises placing the magnet of the line generating device on the metallic attachment surface of the mounting base.

12. The method of claim 7, wherein the light generating device comprises a housing having a light generator positioned within the housing and a knob connected to the light generator, the knob extending outwardly from the housing, and the step of adjusting the light generated from the light generator comprises manually rotating the knob from a first position to a second position, wherein a stop defines the position.

13. The method of claim 7, wherein the light generating device comprises a laser generator assembly comprised of a laser generator and a lens for projecting a laser beam generated from the laser generator, and the step of adjusting the light generated from the light generator comprises rotating one of either the lens or the laser generator clockwise until a stop brings it to its limit wherein the line formed on the second surface is one of either substantially perpendicular or substantially parallel to a bottom of the light generating device.

14. The method of claim 7, wherein the light generating device comprises a housing having a laser generator positioned in the housing and the step of adjusting the light generated from the light generating device comprises rotating the laser generator with respect to the housing until a stop prevents further rotation.

15. A method for projecting a reference line on a surface, the method comprising:
    attaching a mounting base having a metallic attachment surface to a vertical surface;
    attaching a line generating device having a magnet to the mounting base by placing the magnet adjacent to the metallic attachment surface to create a magnetic attachment between the magnet and the attachment surface;
    projecting a laser beam through a lens to form a line on a surface to be illuminated;
    orienting the line on the surface to be illuminated using a first level bubble to create a reference line having a first position on the surface to be illuminated; and
    rotating the laser generator with respect to the mounting base such that the reference line forms a second position, defined by a stop, on the surface to be illuminated.

16. The method of claim 15, wherein the surface to be illuminated forms an angle with the vertical surface.

17. The method of claim 15, wherein the first position of the reference line is one of either substantially perpendicular or substantially parallel to the line generating device and the second position of the reference line is the other of either substantially perpendicular or substantially parallel to the line generating device.

18. The method of claim 15, wherein the pin has a first position within the mounting base and a second position extending through an opening in the mounting base.

19. The method of claim 15, wherein the step of attaching the mounting base to the vertical surface comprises moving a pin from a first position wherein the pin is retracted in the mounting base to a second position wherein the pin is inserted into the vertical surface.

20. The method of claim 19, wherein the mounting base comprises an actuator connected to the pin and by pushing on the actuator, the pin is moved from the first retracted position to the second position.

21. A method for projecting a light beam generated from a light generating device, the method comprising:
    attaching a mounting base to a first surface;
    attaching the light generating device to the mounting base;
    generating light from the line generating device to form a line having a first position on a second surface;
    leveling the line in one plane using at least one bubble level;
    adjusting the light generated from the line generating device such that the line has a second position, defined by a stop, on the second surface, which forms an angle between about 0 and 90 degrees from the first position of the line on the second surface.

22. A method for projecting a reference line onto a surface to be illuminated, the method comprising:
    providing a line generating device having a laser generator, a lens, a rotating mechanism connected to one of either the laser generator or the lens;
    projecting a laser beam from the laser generator through the lens to project a fan-shaped laser beam that forms the reference line on the surface to be illuminated;
    moving the rotating mechanism to a first position wherein the rotating mechanism cooperates with a first stop such that the reference line defines a first position on the surface to be illuminated; and
    moving the rotating mechanism to a second position wherein the rotating mechanism cooperates with a second stop such that the reference line defines a second position on the surface to be illuminated, the second position of the reference line forming an angle of approximately 90 degrees with the first position of the reference line.

* * * * *